United States Patent
Casini et al.

(10) Patent No.: US 11,807,179 B2
(45) Date of Patent: Nov. 7, 2023

(54) METHOD AND SYSTEM FOR VERIFYING THE CORRECT DEPLOYMENT OF AN AIRBAG DEVICE

(71) Applicant: ITALDESIGN-GIUGIARO S.P.A., Turin (IT)

(72) Inventors: Davide Casini, Villarbasse (IT); Nikolas Vinci, Turin (IT)

(73) Assignee: ITALDESIGN-GIUGIARO S.P.A, Turin (IT)

( * ) Notice: Subject to any disclaimer, the term of this patent is extended or adjusted under 35 U.S.C. 154(b) by 398 days.

(21) Appl. No.: 16/973,889

(22) PCT Filed: Aug. 12, 2019

(86) PCT No.: PCT/IB2019/056836
§ 371 (c)(1),
(2) Date: Dec. 10, 2020

(87) PCT Pub. No.: WO2020/035772
PCT Pub. Date: Feb. 20, 2020

(65) Prior Publication Data
US 2021/0253052 A1    Aug. 19, 2021

(30) Foreign Application Priority Data
Aug. 13, 2018  (IT) ......................... 102018000008074

(51) Int. Cl.
*B60R 21/01*    (2006.01)
*G01M 17/007*    (2006.01)
*G01M 99/00*    (2011.01)

(52) U.S. Cl.
CPC .......... *B60R 21/01* (2013.01); *G01M 17/007* (2013.01); *G01M 99/008* (2013.01); *B60R 2021/01225* (2013.01); *B60R 2021/01231* (2013.01)

(58) Field of Classification Search
CPC .......... B60R 21/01; B60R 2021/01225; B60R 2021/01231; B60R 21/16; G01M 17/007; G01M 99/008; G01M 17/00; G06T 7/60
See application file for complete search history.

(56) References Cited

U.S. PATENT DOCUMENTS

2007/0086624 A1 *   4/2007   Breed ............... B60R 21/01552
                                                  382/104

FOREIGN PATENT DOCUMENTS

DE    102010019836 A1    11/2011
JP    H0796815 A    4/1995

OTHER PUBLICATIONS

International Search Report, issued in PCT/IB2019/056836, dated Oct. 23, 2019, Rijswijk, Netherlands.

(Continued)

*Primary Examiner* — Eric S. McCall
*Assistant Examiner* — Timothy P Graves
(74) *Attorney, Agent, or Firm* — ArentFox Schiff LLP; Michael Fainberg

(57) ABSTRACT

A computer-implemented method for checking the correct deployment of an airbag device comprises, in a vehicle or test vehicle model, optionally arranging a dummy or model of a vehicle occupant in the vicinity of the airbag device, triggering the deployment of the air chamber of the airbag device, taking at least one image of a scene including the air chamber at a plurality of discrete times following the triggering of its deployment and verifying the volume of inflation and/or deployment of the air chamber at the plurality of discrete times following the triggering of its deployment on the basis of the at least one image.

13 Claims, 5 Drawing Sheets

(56) References Cited

OTHER PUBLICATIONS

Ika, A test procedure for airbags, Report 8328, Study 2—A Test Procedure for Airbags, Dec. 31, 2008, p. 72-p. 75, p. 117 XP055583415, retrieved from the Internet: https://ec.europa.eu/transport/road_safety/sites/roadsafety/files/pdf/projects_sources/cita_study_2.pdf.

* cited by examiner

METHOD AND SYSTEM FOR VERIFYING
THE CORRECT DEPLOYMENT OF AN
AIRBAG DEVICE

CROSS-REFERENCE TO RELATED APPLICATIONS

This application is a National Phase Application of PCT International Application No. PCT/M2019/056836, having an International Filing Date of Aug. 12, 2019 which claims priority to Italian Application No. 102018000008074 filed Aug. 13, 2018, each of which is hereby incorporated by reference in its entirety.

FIELD OF THE INVENTION

The present invention generally concerns passive safety devices on board vehicles and more specifically airbag devices. In particular, the present invention concerns a method for verifying the correct deployment of an airbag device and a system for verifying the correct deployment of an airbag device, programmed to implement said method.

BACKGROUND OF THE INVENTION

It is well known in the art to examine the deployment of airbag devices arranged to be installed in a vehicle and to verify the correctness thereof in accordance with the specifications of reference. This is done in a test vehicle or test vehicle model, by arranging, if necessary, a dummy or similar model of an occupant of the vehicle or part thereof, whether the driver or a passenger, in the vicinity of the airbag device, triggering the deployment of the air chamber of the airbag device, and verifying the volume of inflation and/or the deployment of the air chamber over time and its location around the dummy or model of the vehicle occupant or around parts of the body of the dummy or model of the vehicle occupant or in designated coverage areas of the airbag.

Verification of the correct deployment of an airbag device over time and space occurs by taking at least one image of a scene including the dummy or model of the vehicle occupant at at least one point in time after the triggering of the deployment of the air chamber, such image being able to be extracted from a sequence of images, i.e. from a moving image or filmed sequence. From these images, a visual inspection is conducted of the volume of inflation and/or the deployment of the air chamber of the airbag device in one or more image analysis areas.

The images are carefully viewed by an operator who visually compares the extension of the air chamber at predetermined regions of the dummy or model or designated areas and compares this extension with a respective predetermined extension mask congruent with the reference specifications (e.g. because the air chamber of the airbag device correctly surrounds a part of the dummy or model or designated area included in the image area).

Consequently, the time interval that has elapsed from the triggering of the deployment of the air chamber of the airbag device until the moment when the image is taken in which the extension of the air chamber is considered to be sufficient, i.e. in compliance with the expected extension, is measured. Normally, the verification is performed on a plurality of image analysis areas that include different parts of the dummy or model to be protected or designated areas.

The test is typically repeated for a series of at least 100 airbag device activations.

The result of the comparison is recorded in a table in the form of a concise indication of the time elapsed between triggering the deployment of the air chamber of the airbag device and reaching an extension of the air chamber deemed adequate.

This operation takes time, since in a first step a filmed sequence or a series of images is taken in association with the activation of the airbag device, then the operator must control the playback of the filmed sequence and stop it at consecutive discrete shooting times established by the verification protocol, or the selective viewing of the static images taken in succession, and for each of them repeat his own visual evaluation. For the latter reason, the outcome may also be distorted by an incorrect perception of the image by the same operator.

SUMMARY OF THE INVENTION

The object of the present invention is to provide a satisfactory solution to the problems described above while avoiding the drawbacks of the known art. In particular, the object of the present invention is to provide a technique for verifying the correct deployment of an airbag device that is rapid, reliable and repeatable.

According to the present invention, said object is achieved by a method for verifying the correct deployment of an airbag device as described and claimed herein.

Particular embodiments are also described.

Particular embodiments form the subject-matter of the dependent claims, the content of which is to be understood as an integral part of the present description.

A further subject-matter of the invention is a computer system for verifying the correct deployment of an airbag device and a computer program or a group of computer programs, executable from a computer system, as claimed.

In summary, the present invention is based on the principle of carrying out a method to verify the correct deployment of an airbag device by means of a computer, programmed to select or identify at least one investigation region in at least one image analysis area, where "select" means an embodiment wherein the region is chosen a priori at a given position in the image, "identify" means an embodiment wherein the system automatically recognizes in the image a relevant area, regardless of its position in the image. In the investigation region, at least one portion of the region representative of the air chamber of an airbag device deployed at one or more measurable points in times since the triggering of the deployment (inflation) of the air chamber is identified. The investigation region is a two-dimensional region or a one-dimensional line.

The identified portion of the investigation region is respectively treated by the computer as a planar two-dimensional geometric figure or as a linear curve (e.g. a segment or a plurality of segments constituting a segmented curve) and the computer is arranged to measure at least one geometric extension thereof. In the case of an identified portion of a two-dimensional investigation region, the geometric extension considered may be an area or linear dimension, for example the length of a contour of the identified portion, the length of an axis of the identified portion (for example, if the identified portion of a two-dimensional investigation region has an approximately regular shape, such as a circular or elliptical shape), or the length of a chord of the identified portion drawn between a pair of predetermined points of said portion. In the case of an identified portion of a one-dimensional investigation region, the geometric extension considered may be the length of one or more segments constituting such identified portion.

Advantageously, the identification of the portion of an investigation region is based on a color contrast property between said portion and a background of the image or an area of the image representative of a dummy or model of the vehicle occupant.

In an embodiment of the present invention, the measurement of the geometric extension of an identified portion of the investigation region is carried out on images of a scene, for example including a dummy or model of a vehicle occupant, if necessary, taken at a plurality of discrete points in time after the triggering of the deployment of the air chamber and is compared with a reference threshold value. At the first occurrence wherein the measurement of the geometric extension is equal to or greater than the reference threshold value, the time elapsed from the point in time of triggering the deployment of the air chamber to the point in time at which this image was taken is measured. It may be concluded that the airbag device has reached a correct deployment if the portion of the investigation region representative of the air chamber being inflated (or at the end of inflation) has reached a geometric extension greater than or equal to the reference threshold value in a time not exceeding a reference time, as this ensures the protection of the vehicle occupant. Conversely, if the portion of the investigation region representative of the air chamber being inflated (or at the end of inflation) has reached a geometric extension greater than or equal to the reference threshold value in a time greater than the reference time, it may be concluded that the airbag device has not reached a correct deployment, because the air chamber being inflated (or at the end of inflation) has not reached the geometric extension required at the reference point in time to ensure the protection of the vehicle occupant.

In a dual embodiment of the present invention, the measurement of the geometric extension of an identified portion of the investigation region is extracted from an image taken at at least one predetermined reference point in time from the triggering of the deployment of the air chamber, and is compared with a reference threshold value of such measurement associated with such reference point in time. If the measurement of the geometric extension is greater than or equal to the reference threshold value, it may be concluded that the airbag device has reached a correct deployment, since the air chamber being inflated (or at the end of inflation) has reached (or exceeded) the minimum extension required at that reference point in time to ensure the protection of the vehicle occupant. Conversely, if the measurement of the geometric extension is less than the reference threshold value, it may be concluded that the airbag device has not reached a correct deployment, since the air chamber being inflated (or at the end of inflation) has not reached the minimum extension required at that reference point in time to ensure the protection of the vehicle occupant.

Appropriately, the measurement of the geometric extension of an identified portion of an investigation region is carried out on a plurality of images taken at a plurality of discrete points in time following the triggering of the deployment of the air chamber and is compared with a plurality of reference threshold values indicative of the evolution over time of the deployment of the air chamber of the airbag device.

At the first occurrence wherein the measurement of the geometric extension is equal to or greater than the respective reference threshold value and for the plurality of reference threshold values, the corresponding time elapsed from the point in time of triggering the deployment of the air chamber to the point in time in which this image was taken is measured. It may be concluded that the airbag device has reached a correct deployment if the portion of the investigation region representative of the air chamber being inflated (or at the end of inflation) has reached a geometric extension greater than or equal to a respective reference threshold value in a time not exceeding a respective reference time, as this ensures the protection of the vehicle occupant over time. Conversely, if the portion of the investigation region representative of the air chamber being inflated (or at the end of inflation) has reached a geometric extension greater than or equal to a respective reference threshold value in a time greater than the respective reference time, in at least one occurrence, it may be concluded that the airbag device has not reached a correct deployment, because the air chamber being inflated (or at the end of inflation) has not reached the geometric extension required at at least one reference point in time to ensure the protection of the occupant of the vehicle.

Alternatively, the measurement of the geometric extension of an identified portion of an investigation region is carried out on a plurality of images taken at a plurality of reference points in time following the triggering of the deployment of the air chamber. The determination that the airbag device has reached a correct deployment is reached if the measurements of the geometric extension of the identified portions of an investigation region are all greater than or equal to a respective reference threshold value associated with a respective reference time. Conversely, if at least one measurement of the geometric extension of an identified portion of an investigation region at one of the reference points in time is less than the respective reference threshold value, it may be concluded that the airbag device has not reached a correct deployment, because the air chamber being inflated (or at the end of inflation) has not reached the minimum extension required for at least one reference point in time to ensure the protection of the vehicle occupant.

Appropriately, the identification of a portion of an investigation region representative of the air chamber of an airbag device deployed at one or more measurable points in time from the triggering of the inflation of the air chamber is carried out on a plurality of distinct areas of an image, for example containing a dummy or a model of a vehicle occupant if necessary. The determination of the correct deployment of the airbag device is reached if all of the above claimed conditions of relation between the measurement of the geometric extension of an identified portion of an investigation region and the time elapsed from the point in time of triggering the deployment of the air chamber are met for each image analysis area.

BRIEF DESCRIPTION OF THE DRAWINGS

Further features and advantages of the invention will be described in greater detail in the following detailed description of an embodiment thereof, given by way of non-limiting example, with reference to the accompanying drawings wherein.

DETAILED DESCRIPTION

Figure 1:
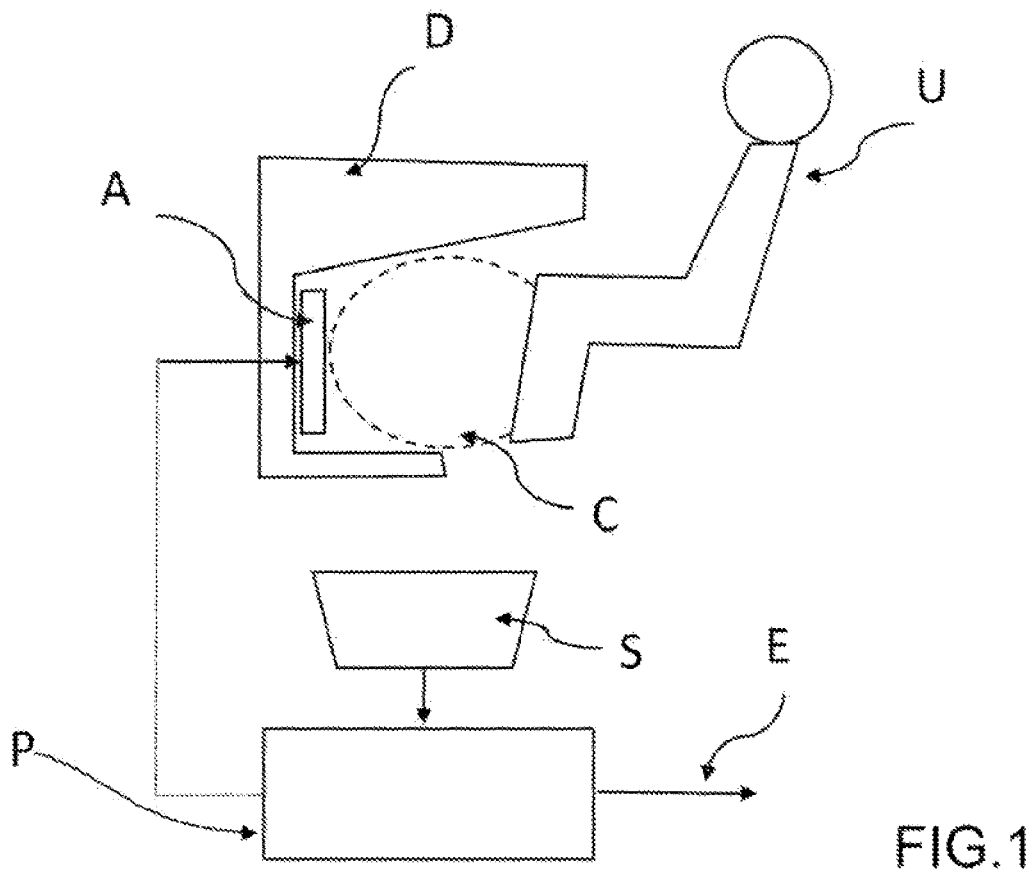
FIG. 1 is a schematic representation of a system for verifying the correct deployment of an airbag device according to the invention, referring, by way of example, to an airbag device for the protection of the legs of an occupant of a motor vehicle.

With reference to FIG. 1, the key elements of a system for verifying the correct deployment of an airbag device according to the present invention are shown.

The dashboard of a vehicle, or a model thereof, is indicated at D in front of which is placed a dummy or model U of a vehicle occupant, whether the driver or a passenger.

In the lower part of the dashboard D there is an airbag device A for leg protection of an occupant of the vehicle which, in an intervention condition, is adapted to deploy an air chamber C which, in a fully inflated condition, at least partially envelops the legs of the dummy or model U. Appropriately, the intervention condition of the airbag device A is not triggered by a collision event or abrupt deceleration of the vehicle dashboard D but is controlled separately by processing and control devices P.

Associated with the combination of the airbag device and dummy or model of the vehicle occupant, if present, are camera means S for taking static images at discrete times, or a moving image or filmed sequence, of a scene including the air chamber C of the airbag device A and the dummy or model U, if present. To the camera means S are coupled the processing and control means P, which are likewise arranged for the analysis of the images taken, in at least predetermined areas of analysis of said images, at different intervals of time calculated from a point in time of triggering the airbag device. Said processing and control means P include, or are associated therewith, a clock, a stopwatch or similar time measurement means synchronized with said camera means S, if the processing is not subsequently carried out on the basis of the filmed sequences generated by the camera means S. The processing and control means are provided for the determination of a result E of the verification of deployment of the airbag device, which is made available to an operator, for example as a notification signal of a correct deployment condition or of an incorrect deployment condition, or as complex data in the form of a correlation table between a plurality of deployment conditions and the related measurement or reference times.

Figure 2:
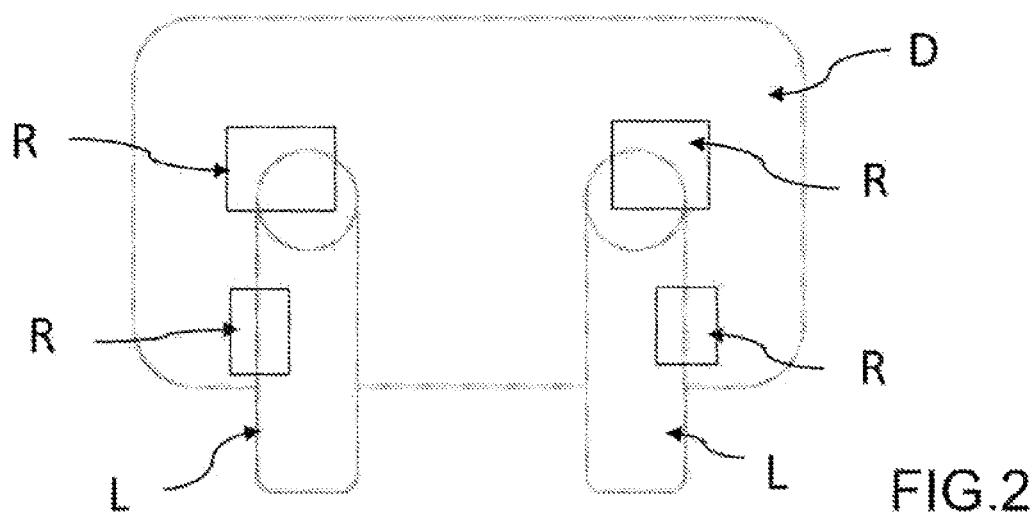
FIG. 2 is a schematic representation of an image of a scene including a dummy or model of a vehicle occupant, and examples of selected image analysis areas at predetermined portions of said dummy or model of a vehicle occupant.

FIG. 2 is a schematic representation of an image of a scene including a dummy or model of a vehicle occupant, here represented by a pair of legs L in the foreground with respect to the dashboard D, and examples of image analysis areas R selected or identified at predetermined portions of said dummy or model of a vehicle occupant, if present. In the embodiment shown by way of example, the image analysis areas include regions representative of each leg and adjacent areas, respectively at an outer upper part (e.g., right knee and left knee) and an outer intermediate part of each leg (e.g., right tibia and left tibia).

These regions may be selected a priori on the basis of the image coordinates of the scene, starting from a known arrangement of the camera means, or identified from time to time by the processing and control means as a result of the recognition of image elements, for example recurring image elements such as predefined parts of the dummy or model U.

FIGS. 3a-3d show images of the scene of FIG. 2 taken in a succession of discrete points in time by the camera means S, which also include the air chamber C of the airbag device A, in four consecutive conditions of deployment, i.e. inflation. Portions of the image analysis areas R are highlighted in the figure with dashed lines where the processing and control means P are programmed to select an investigation region within which to identify a portion representative of the deployed air chamber C.

Figure 3A:
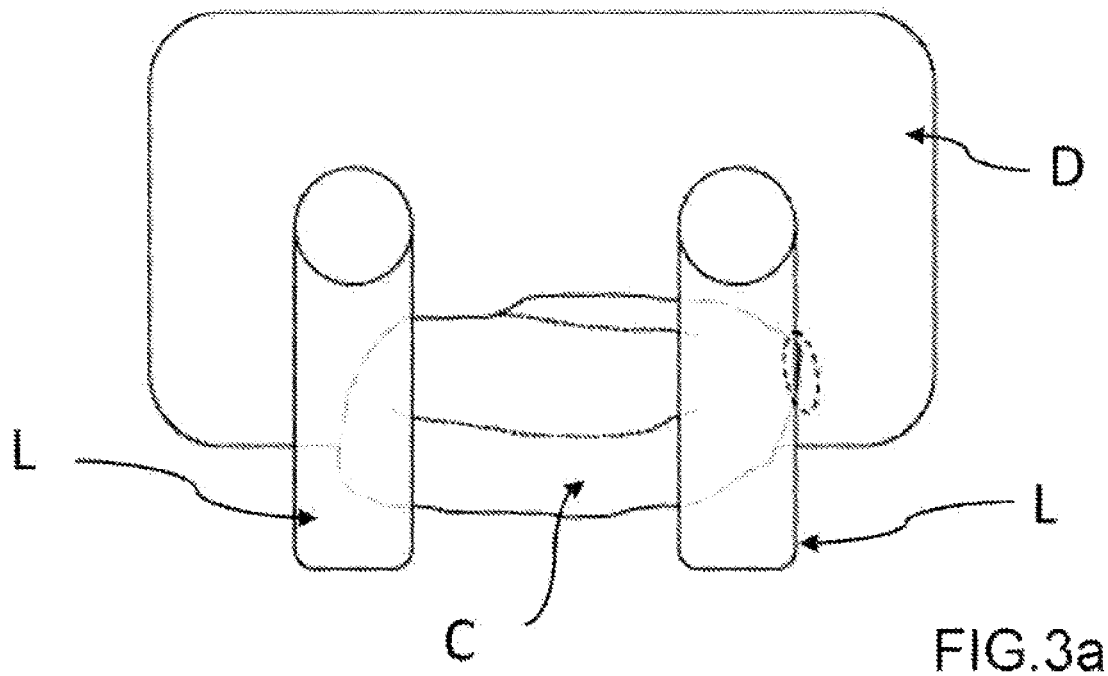
FIGS. 3a-3d show a temporal succession of images of the scene in FIG. 2 wherein the deployment of the air chamber of an airbag device is shot at consecutive points in time.
Figure 3B:
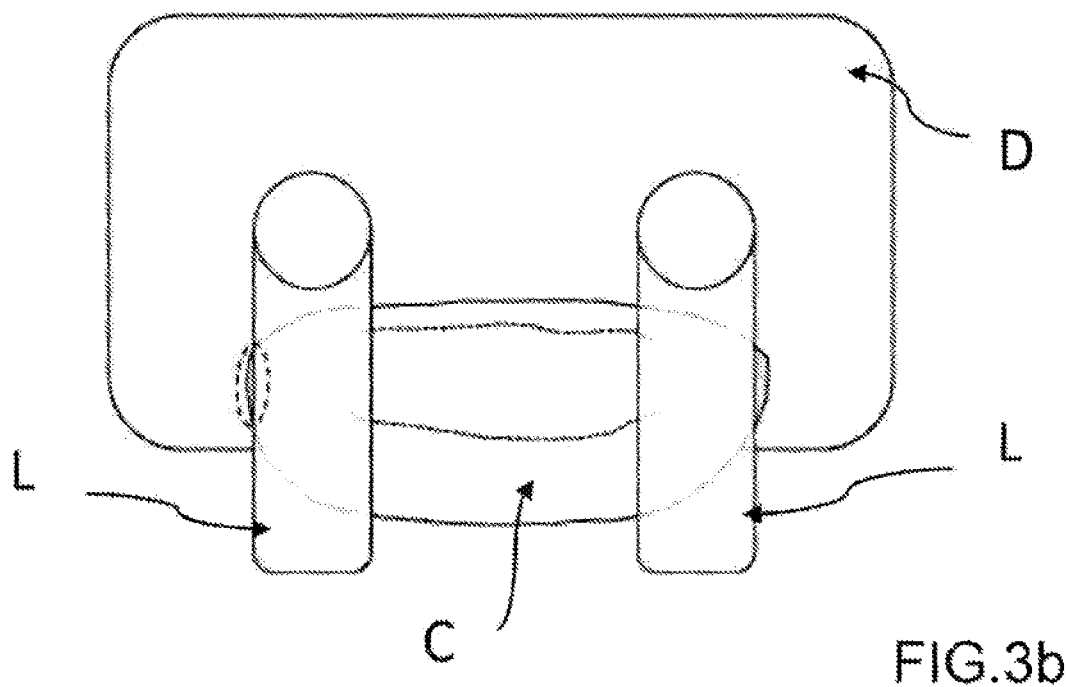
Figure 3C:
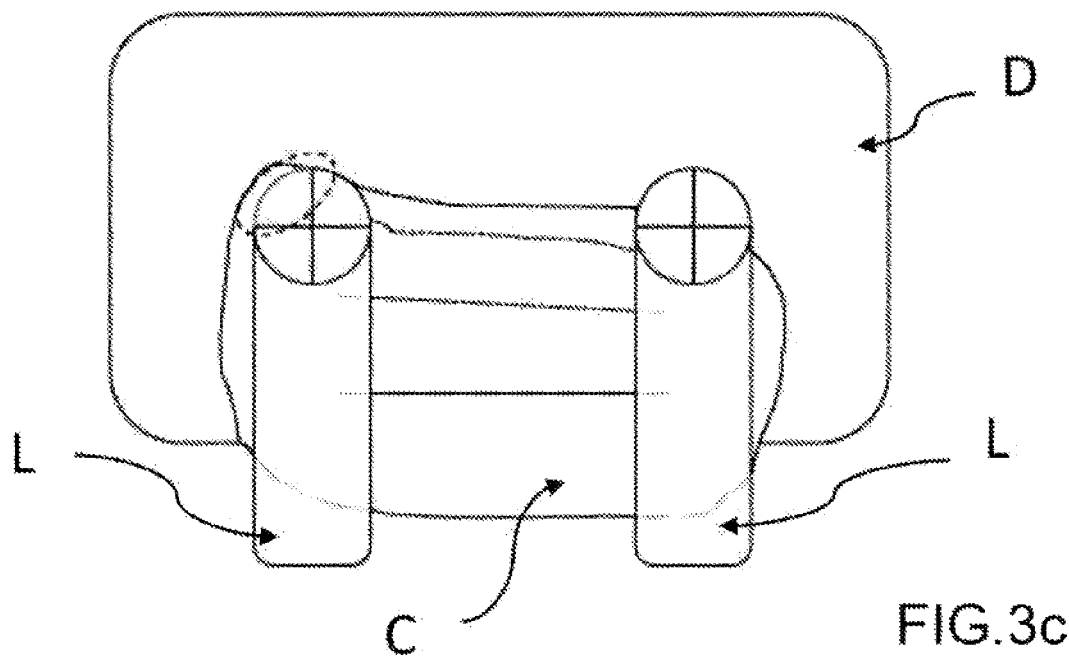
Figure 3D:
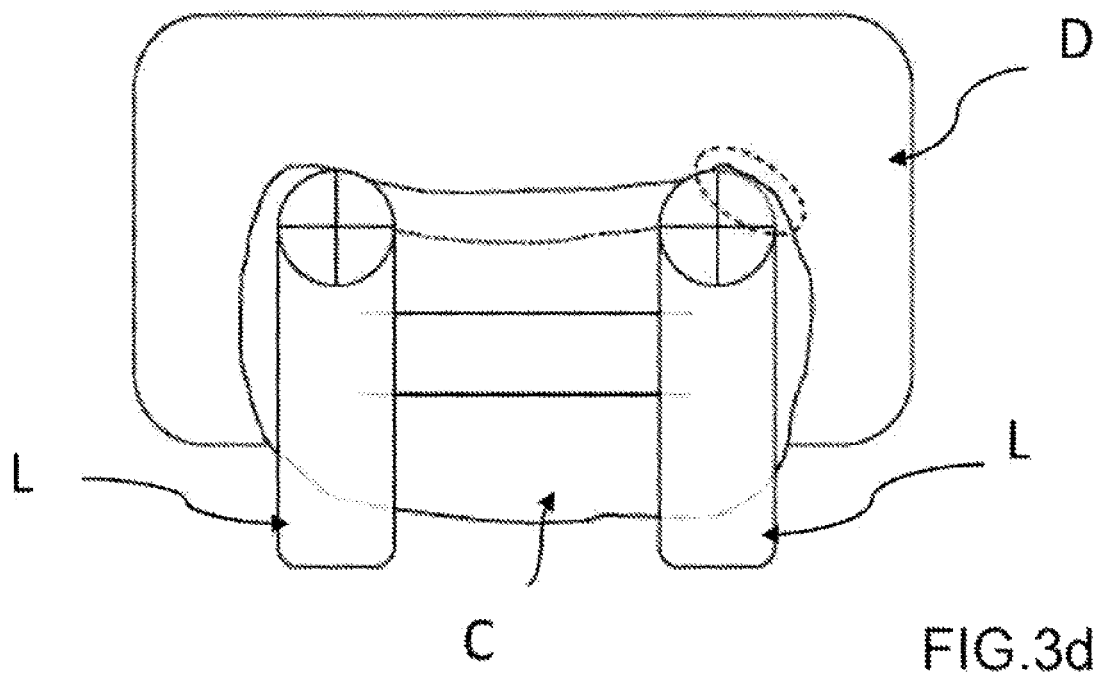

As may be seen from FIGS. 3a-3d, the deployment of the air chamber C of the airbag device A evolves over time, first reaching the right tibia (FIG. 3a), then the left tibia (FIG. 3b), then the left knee (FIG. 3c), finally the right knee (FIG. 3d).

Figure 4A:
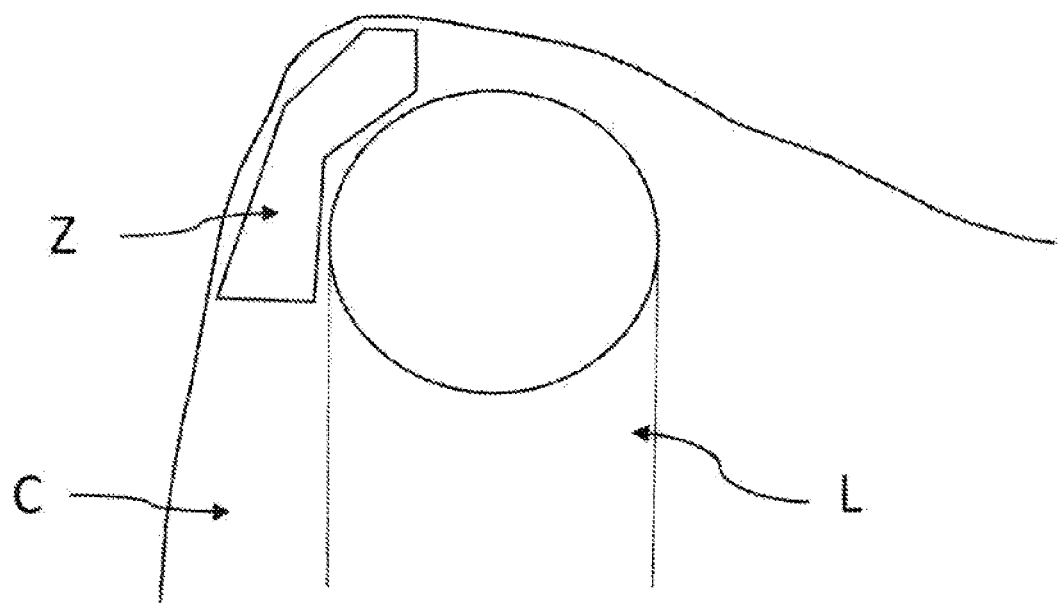
FIGS. 4a and 4b are enlargements of an image analysis area of FIG. 3d wherein possible embodiments of investigation regions are highlighted, respectively a two-dimensional investigation region and a one-dimensional investigation region.

FIG. 4a shows in more detail a region Z of investigation set with the processing and control means P by an operator, in a magnification of an image analysis area R of the FIG. 3d. The region Z is a two-dimensional area that represents a desired deployment extension of the air chamber C, i.e. it must partially or entirely contain an image portion representative of the deployed air chamber. It has a contour the length of which may be measured in an image reference system and an inner surface the area of which may also be measured in an image reference system.

Figure 4B:
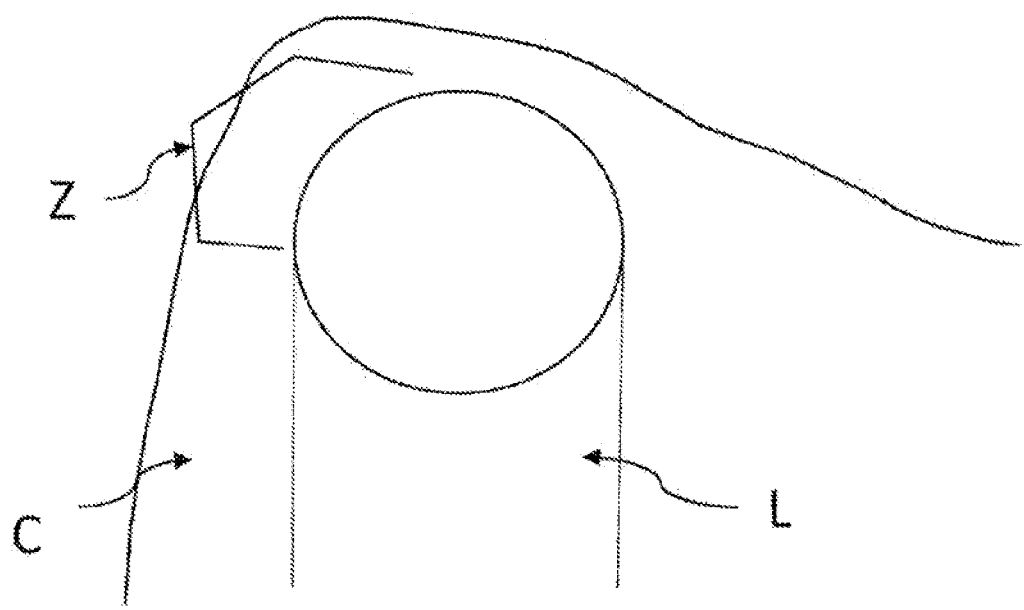

In an alternative embodiment, represented in FIG. 4b, a one-dimensional investigation region Z is shown in the form of a segmented line representing an outline that must partly or entirely belong to, or—in equivalent terms—contain, a portion of the image representative of the deployed air chamber. The segmented line has an overall length and lengths of the individual component segments measurable in an image reference system.

In a currently preferred embodiment, the processing and control system P checks when the investigation region Z is entirely occupied by pixels of the image of the deployed air chamber, or is occupied by image pixels of the deployed air chamber for an area greater than a predetermined minimum threshold, or even—in the case of the investigation region Z being two-dimensional—a linear extension thereof such as the perimeter is entirely contained in an image of the deployed air chamber. This is achieved by recognizing the image pixels representative of the deployed air chamber with respect to the pixels representative of the background or other elements of the image by virtue of the color of the pixels representative of the air chamber. This verification may occur for a single investigation region or for multiple investigation regions in multiple image analysis areas, each associated with a respective reference time.

Upon completion of the verification, the system measures the point in time wherein this condition occurred in relation to the point in time of triggering the airbag device and populates a data table, as follows, by way of example, for the airbag device shown in FIG. 1:

|  | right tibia | left tibia | right knee | left knee |
| --- | --- | --- | --- | --- |
| Test 1 | 0.0055 | 0.0085 | 0.015 | 0.0185 |
| Test 2 . . . | | | | |

The data in the table are automatically compared with the reference data, e.g. with a reference inflation time of the air chamber predetermined by a specification, which in a practical example may be as follows:

Right tibia protection: t<0.006 s
Left tibia protection: t<0.008 s
Right knee protection: t<0.016 s
Left knee protection: t<0.020 s From the comparison, it is possible to automatically deduce that the protective condition of the left tibia is not met and is thus determined to be an incorrect deployment of the airbag device.

Alternatively, the processing and control system P checks, at a plurality of predetermined reference times—e.g. t1=0.006 s, t2=0.008 s, t3=0.016 s and t4=0.020 s—the occupancy percentage of the investigation region Z by an image of the deployed air chamber, or the percentage of containment of a linear extension in an image of the deployed air chamber.

This verification may occur for a single investigation region or for multiple investigation regions in multiple image analysis areas, each associated with a respective reference time. At the end of the verification, the system measures the aforesaid occupancy percentage or containment of the investigation region Z at the respective reference points in time $t_{ref}$ of the different image areas with respect to the point in time of triggering the airbag device, and populates a data table, as follows, by way of example, for the airbag device in FIG. 1:

|  | right tibia | left tibia | right knee | left knee |
|---|---|---|---|---|
| Test 1 @ $t_{ref}$ | 100% | 90% | 100% | 98% |
| Test 2 @ $t_{ref}$ | | | | |
| ... | | | | |

The data in the table are automatically compared with reference data, for example with an occupancy percentage or containment of the investigation region Z predetermined by a specification, which in a practical example may be:

Right tibia protection: 98%
Left tibia protection: 98%
Right knee protection: 98%
Left knee protection: 98%

From the comparison, it is possible to automatically deduce that the protective condition of the left tibia is not met and is thus determined to be an incorrect deployment of the airbag device.

Figure 5A:
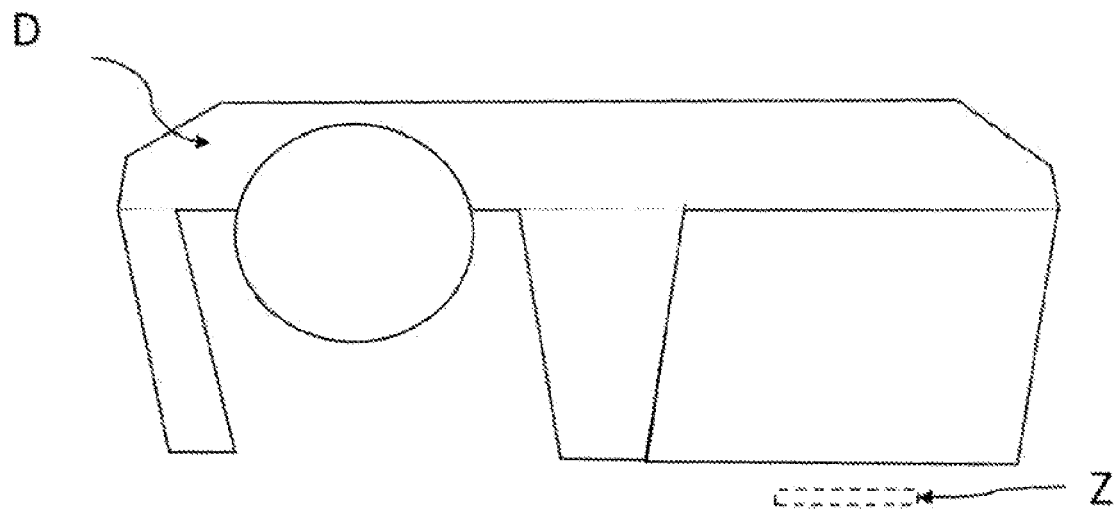
FIGS. 5a and 5b schematically show an application variant of the system according to the invention, referring, by way of example, to an airbag device for the protection of a passenger of a motor vehicle.
Figure 5B:
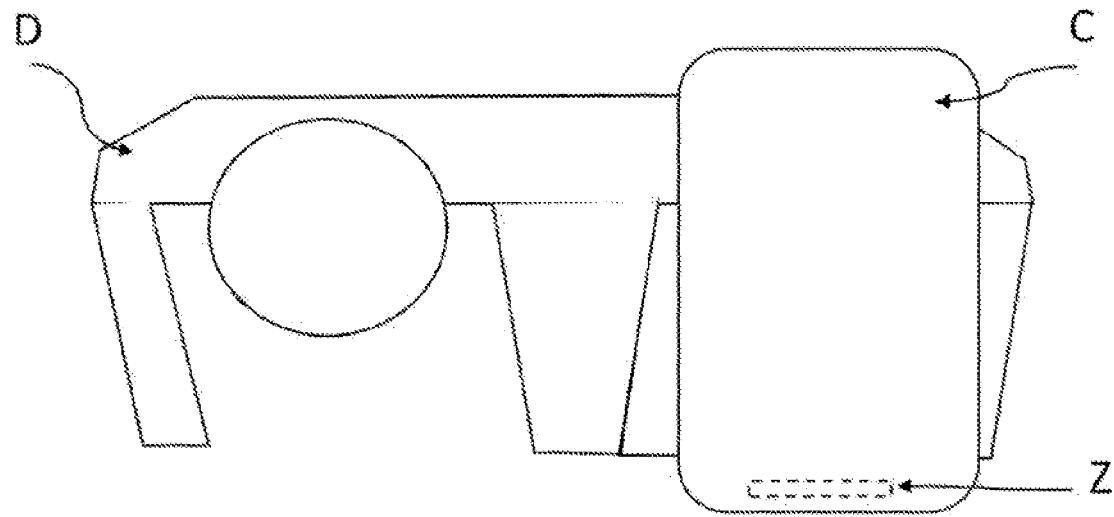

FIGS. 5a and 5b schematically show an application variant of the system according to the invention, referring, by way of example, to an airbag device A' for the protection of the head and torso of a passenger of a motor vehicle. In FIGS. 5a and 5b, elements or components identical or functionally equivalent to those illustrated in FIG. 1 have been indicated with the same references already used in the description of the previous figure. In particular, Z' indicates an investigation region of an image analysis area set with the processing and control means P by an operator for the recognition of a deployment condition of the air chamber C of the airbag device A'.

The operation of the system is similar to that which is described above.

It should be noted that the embodiment proposed for the present invention in the foregoing discussion is purely by way of non-limiting example of the present invention. A person skilled in the art may easily implement the present invention in different embodiments of airbag devices without departing from the principles set forth herein.

In general, the processing and control means P in the described configuration or other equivalent configurations are arranged to implement a method to verify the correct deployment of an airbag device on the basis of programs or groups of programs (modules) stored in an associated memory (not shown in the figures).

Obviously, without affecting the principle of the invention, the embodiments and the details of implementation may be greatly modified with respect to those described and illustrated purely by way of a non-limiting example, without thereby departing from the scope of the invention as defined in the accompanying claims.

The invention claimed is:

1. A computer-implemented method for verifying correct deployment of an airbag device, comprising, in a test vehicle or in a test vehicle model, triggering the deployment of an air chamber of said airbag device, taking images of a scene including said air chamber at a plurality of discrete times following the triggering of its deployment and verifying a volume of inflation and/or deployment of said air chamber at said plurality of discrete times after the triggering of the deployment based on said images, the method further comprising:
identifying or selecting respective investigation regions in a plurality of image analysis areas;
identifying respective portions of said respective investigation regions, wherein each portion is representative of said deployed air chamber having a respective measurement of at least one geometric extension of said respective portions not lower than a respective reference threshold value; and
measuring a time interval elapsed from the triggering of the deployment of the air chamber to a discrete point in time associated with identification of a respective portion of said respective investigation regions representative of said deployed air chamber having a measurement of at least one geometric extension of said respective portion not lower than the respective reference threshold value, and comparing said measured time interval with a respective reference time threshold value associated with said respective reference geometric extension threshold value, whereby if each measured time interval is lower than or equal to the respective reference time threshold value, the airbag device has reached correct deployment, and if at least one measured time interval is greater than the respective reference time threshold value, the airbag device has not reached correct deployment.

2. The computer-implemented method of claim 1, wherein the respective investigation regions are two-dimensional regions and said at least one geometric extension of said respective portions of the respective investigation regions representative of the deployed air chamber is an area of said respective portions or a linear dimension of said respective portions, including a length of a contour of said respective portions or a length of an axis of said respective portions or a length of a chord of said respective portions drawn between a pair of pre-established points.

3. The computer-implemented method of claim 1, wherein the respective investigation regions are one-dimensional regions and said at least one geometric extension of said respective portions of the respective investigation regions representative of the deployed air chamber is a linear dimension of said respective portions, including a length of one or more segments of said respective portions.

4. The computer-implemented method of claim 1, further comprising providing a dummy or model of a vehicle occupant in the vicinity of said airbag device, taking images of a scene including said dummy or model of the vehicle occupant and identifying or selecting a predetermined investigation region in said image analysis areas including a part of said dummy or model of the vehicle occupant, wherein said identification is based on a color contrast property between said respective portions representative of said deployed air chamber and a background region of said image analysis areas or a region of said image analysis areas representative of said dummy or model of the vehicle occupant.

5. A computer system for checking correct deployment of an airbag device, programmed to perform the method of claim 1.

6. A non-transitory computer readable medium storing a computer program or group of computer programs, executable by a computer system, comprising one or more code modules for implementing the method for verifying correct deployment of an airbag device of claim 1.

7. A computer-implemented method for verifying correct deployment of an airbag device, comprising, in a test vehicle or in a test vehicle model, triggering the deployment of an air chamber of said airbag device, taking at least one image of a scene including said air chamber at at least one reference time following the triggering of its deployment and verifying a volume of inflation and/or deployment of said air chamber at said at least one reference time based on said at least one image, the method further comprising:

identifying or selecting at least one investigation region in at least one image analysis area;

identifying a respective portion of said at least one investigation region representative of said deployed air chamber a plurality of reference times;

measuring at least one geometric extension of said identified respective portion of the at least one investigation region at the plurality of reference times and comparing measurement of the at least one geometric extension with a respective reference threshold value associated with a respective reference time, and determining that the airbag device has reached correct deployment if measurements of the at least one geometric extension are all greater than or equal to the respective reference threshold value associated with the respective reference time, or that the airbag device has not reached correct deployment if at least one of said measurements of the at least one geometric extension is lower than the respective reference threshold value associated with the respective reference time.

8. The computer-implemented method of claim 7, further comprising:

identifying or selecting respective investigation regions in a plurality of image areas;

identifying respective portions of said respective investigation regions representative of said deployed air chamber at said reference time; and measuring at least one respective geometric extension of each of said respective portions of the identified respective investigation regions and comparing measurements of the at least one respective geometric extension of each of said respective portions of the identified respective investigation regions with respective reference threshold values associated with said reference time, whereby, if said measurements of geometric extension of each of said respective portions of the identified respective investigation regions are all greater than or equal to the respective reference threshold values, the airbag device has reached correct deployment, and if at least one measurement of a geometric extension of at least one of said respective portions of the identified respective investigation regions is less than the respective reference threshold value, the airbag device has not reached correct deployment.

9. The computer-implemented method of claim 7, wherein said at least one investigation region is a two-dimensional region and said at least one geometric extension of said identified respective portion of the at least one investigation region representative of the deployed air chamber is an area of said identified respective portion or a linear dimension of said identified respective portion, including a length of a contour of said identified respective portion or a length of an axis of said identified respective portion or a length of a chord of said identified respective portion drawn between a pair of pre-established points.

10. The computer-implemented method of claim 7, wherein said at least one investigation region is a one-dimensional region and said at least one geometric extension of said identified respective portion of the at least one investigation region representative of the deployed air chamber is a linear dimension of said identified respective portion, including a length of one or more segments of said identified respective portion.

11. The computer-implemented method of claim 7, further comprising providing a dummy or model of a vehicle occupant in the vicinity of said airbag device, taking at least one image of a scene including said dummy or model of the vehicle occupant and identifying or selecting a predetermined investigation region in at least one image analysis area including a part of said dummy or model of the vehicle occupant, wherein said identification is based on a color contrast property between said respective portion representative of said deployed air chamber and a background region of said at least one image analysis area or a region of said at least one image analysis area representative of said dummy or model of the vehicle occupant.

12. A computer system for checking correct deployment of an airbag device, programmed to perform the method of claim 7.

13. A non-transitory computer readable medium storing a computer program or group of computer programs, executable by a computer system, comprising one or more code modules for implementing the method for verifying correct deployment of an airbag device of claim 7.

* * * * *